(12) United States Patent
Lam et al.

(10) Patent No.: US 9,523,226 B1
(45) Date of Patent: Dec. 20, 2016

(54) 360 DEGREE BI-STABLE DUAL PIVOT HINGE

(71) Applicant: GOOGLE INC., Mountain View, CA (US)

(72) Inventors: Lawrence Lam, San Jose, CA (US); Prashant Patel, Cupertino, CA (US)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 14/640,627

(22) Filed: Mar. 6, 2015

Related U.S. Application Data

(63) Continuation of application No. 14/338,000, filed on Jul. 22, 2014, now abandoned, which is a continuation of application No. 14/104,283, filed on Dec. 12, 2013, now abandoned.

(51) Int. Cl.
| | |
|---|---|
| *G06F 1/16* | (2006.01) |
| *E05D 11/10* | (2006.01) |
| *E05D 11/08* | (2006.01) |
| *E05D 3/12* | (2006.01) |

(52) U.S. Cl.
CPC ............. *E05D 11/1028* (2013.01); *E05D 3/12* (2013.01); *E05D 11/081* (2013.01); *E05D 11/082* (2013.01); *E05D 11/1007* (2013.01); *G06F 1/1618* (2013.01); *G06F 1/1681* (2013.01); *G06F 1/1683* (2013.01)

(58) Field of Classification Search
CPC ..... G06F 1/1601; G06F 1/1681; G06F 1/1658
USPC ... 455/552.1, 452.1, 561, 414.1, 550.1, 566, 455/127.5; 206/508, 503, 349, 372, 581, 206/316.1, 308.1; 312/362, 223.2, 219, 312/221, 215, 328, 333, 404, 319.1, 312/111; 361/679.27, 679.01, 679.46, 361/679.55, 679.11, 679.09, 679.56, 361/679.3, 679.28, 679.47, 679.58, 361/679.08, 679.4, 579.55, 679.26, 361/679.33, 679.37, 679.59, 679.57, 361/679.43, 679.41; 439/638, 359, 439/357, 348, 350, 76.1, 427, 502
See application file for complete search history.

(56) References Cited

U.S. PATENT DOCUMENTS

| | | |
|---|---|---|
| 5,751,544 A | 5/1998 | Song |
| 6,493,216 B1 | 12/2002 | Lin |
| 7,155,266 B2 | 12/2006 | Stefansen |
| 7,345,872 B2 | 3/2008 | Wang |
| 8,208,245 B2 | 6/2012 | Staats et al. |

(Continued)

FOREIGN PATENT DOCUMENTS

EP 1698156 B1 5/2011

OTHER PUBLICATIONS

"Double Acting Barrel Hinges—Spring Hinges—Double Acting Hinges", HardwareSource.com, retrieved on Oct. 17, 2013 from http://www.hardwaresource.com/hinges/DOOR+HINGES/Spring+Hinges+-+Double+Acting+Hinges/Double+Acting+Barrel+Hinges, 3 pages.

(Continued)

*Primary Examiner* — Hung Duong
(74) *Attorney, Agent, or Firm* — Brake Hughes Bellermann LLP

(57) ABSTRACT

In one general aspect, a computing device includes a lid, and a base coupled to the lid by a hinge, the hinge including a bi-stable hinge part including a toggle pivot and a toggle link bar, and a barrel hinge part including a hollow shaft, at least one friction element surrounding a first portion of the hollow shaft, and a casing surrounding a second portion of the hollow shaft, the casing being connected to the toggle link bar. The computing device includes a first mounting tab connected to the toggle link bar and connected to the base, (Continued)

and a second mounting tab connected to the at least one friction element and connected to the lid. The barrel hinge part enables the at least one friction element to rotate about the hollow shaft causing the lid to rotate relative to the base.

20 Claims, 10 Drawing Sheets

(56) References Cited

U.S. PATENT DOCUMENTS

| | | |
|---|---|---|
| 8,395,722 B2 | 3/2013 | Mathew et al. |
| 2004/0155861 A1 | 8/2004 | Jackson, III |
| 2005/0162821 A1* | 7/2005 | Homer .................... G06F 1/162 |
| | | 361/679.07 |
| 2009/0244009 A1 | 10/2009 | Staats et al. |
| 2011/0128688 A1* | 6/2011 | Xiao ..................... G06F 1/1681 |
| | | 361/679.02 |
| 2012/0099264 A1* | 4/2012 | Degner ................ G06F 1/1616 |
| | | 361/679.09 |
| 2012/0106060 A1 | 5/2012 | Probst et al. |
| 2013/0286578 A1 | 10/2013 | Degner et al. |

OTHER PUBLICATIONS

"IdeaPad Yoga 11s: Mini Laptop & Convertible Ultrabook", Lenovo, retrieved on Oct. 17, 2013 from http://shop.lenovo.com/us/en/laptops/ideapad/yoga/yoga-11s/, 4 pages.

Notice of Allowance for U.S. Appl. No. 14/104,283, mailed Apr. 28, 2014, 17 pages.

Notice of Allowance for U.S. Appl. No. 14/338,000, mailed Dec. 9, 2014, 14 pages.

* cited by examiner

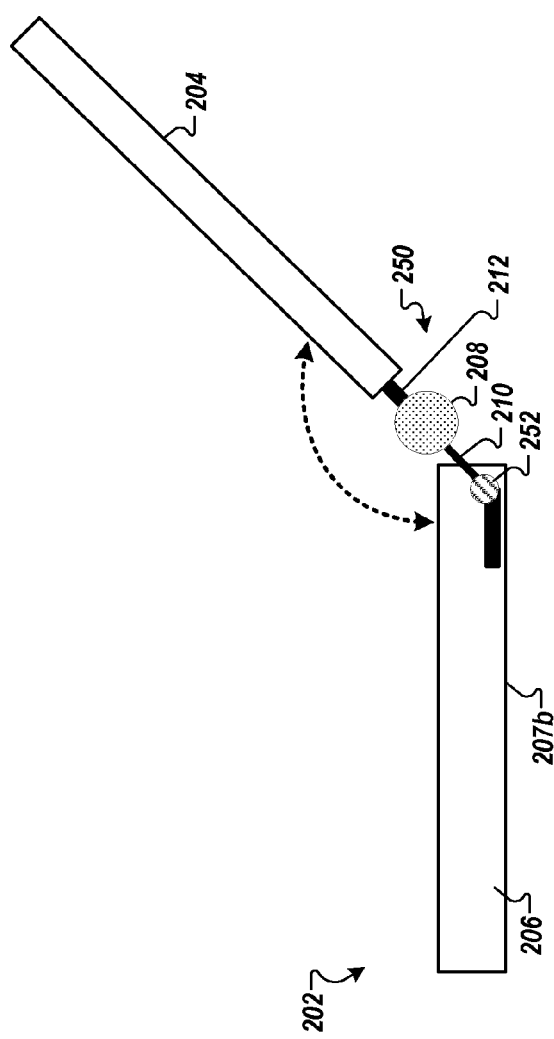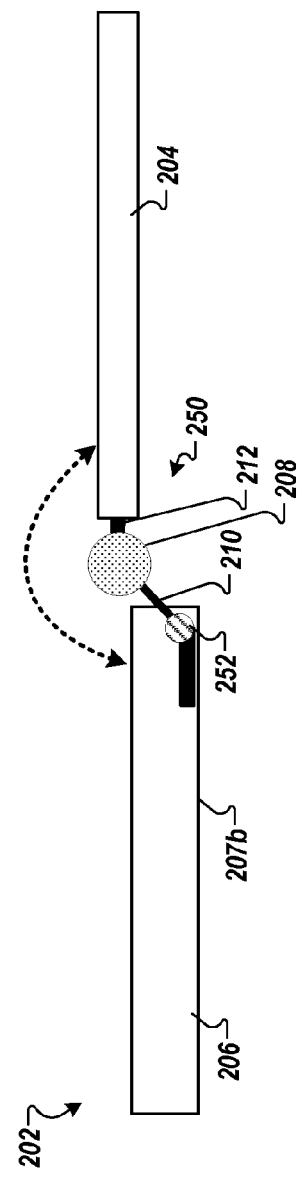

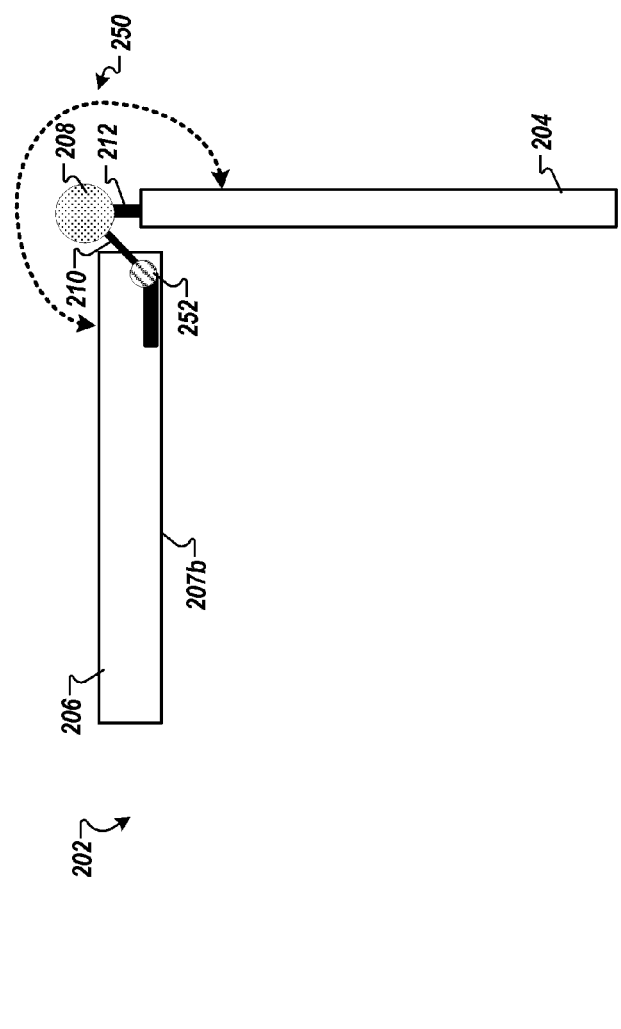
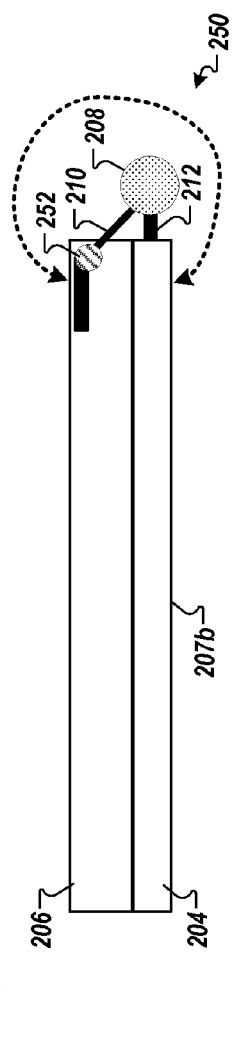
FIG. 2C
FIG. 2D

360 DEGREE BI-STABLE DUAL PIVOT HINGE

CROSS-REFERENCE TO RELATED APPLICATIONS

This application is a continuation of and claims priority under 35 U.S.C. §120 to U.S. application Ser. No. 14/338,000, filed on Jul. 22, 2014, and entitled "360 DEGREE BI-STABLE DUAL PIVOT HINGE", which is a continuation of and claims priority under 35 U.S.C. §120 to U.S. application Ser. No. 14/104,283, filed on Dec. 12, 2013, and entitled "360 DEGREE BI-STABLE DUAL PIVOT HINGE", the contents of both of which are hereby incorporated by reference.

TECHNICAL FIELD

This description generally relates to hinges for computing devices.

BACKGROUND

A computing device may be assembled from multiple separate parts. In addition, one or more components of the computing device may be used to attach the multiple parts of the computing device, and, in some cases, the attached parts may be moved and/or rotated with respect to one another. Example computing devices, such as laptop or notebook computers may include a lid and a base. The lid can include a display device (e.g., a touchscreen) and the base can include one or more input devices, such as a keyboard, a pointing stick, mouse buttons, a touchpad, and/or a trackpad. The lid can be attached to the base such that the lid can be moved and/or rotated with respect to the base so that the computing device can be placed into multiple positions. In order to achieve this rotation, the lid can be attached to the base using one or more moveable hinges that will allow the lid to be rotated about the base.

For example, in a closed position, the lid of the computing device is in contact with the top of the base of the computing device. In an open position, for example, where a user of the computing device can view and interact with both the touchscreen and the input devices included in the base, the lid may be placed in a stationary position and at approximately a 130-degree angle with respect to the base. In a full open position, for example, the user of the computing device may interact with the touchscreen display alone (e.g., using the computing device as a tablet). In this full open position, the lid of the computing device is in contact with the bottom of the base of the computing device. In order for a computing device to achieve all of these positions, the lid of the computing device must be able to be rotated nearly 360 degrees.

The amount of area occupied by one or more hinges used to couple the lid of the computing device to the base of the computing device can affect the overall size (e.g., thickness) of the computing device. As computing devices become smaller and thinner, it would be beneficial if the one or more hinges used to couple the lid to the base of the computing device could also be reduced in size (e.g., diameter). In some cases, however, this may be difficult when the lid of the computing device must be able to be rotated nearly 360 degrees with respect to the base of the computing device.

Thus, a need exists for systems, methods, and apparatus to address the shortfalls of present technology and to provide other new and innovative features.

SUMMARY

In one general aspect, a computing device includes a lid, and a base coupled to the lid by a hinge, the hinge including a bi-stable hinge part including a toggle pivot and a toggle link bar, and a barrel hinge part including a hollow shaft, at least one friction element surrounding a first portion of the hollow shaft, and a casing surrounding a second portion of the hollow shaft, the casing being connected to the toggle link bar. The computing device includes a first mounting tab being connected to the toggle link bar and being connected to the base, and a second mounting tab being connected to the at least one friction element and being connected to the lid, where the barrel hinge part enables the at least one friction element to rotate about the hollow shaft causing the lid to rotate relative to the base, the rotation being from a first position to a second position, where the bi-stable hinge part has two stable rotational positions and unstable rotational positions between the two stable rotational positions, where the bi-stable hinge part enables the toggle pivot to rotate causing the lid to rotate relative to the base, the rotation being from the second position to a third position, and where a diameter of the bi-stable hinge part is less than a diameter of the barrel hinge part.

Example implementations may include one or more of the following features. For instance, the computing device may further include a plurality of wires that pass through the hollow shaft. The plurality of wires may connect a first electrical component in the base of the computing device to a second electrical component in the lid of the computing device. The first electrical component may be a main logic board. The second electrical component may be one of a display, a camera sensor, a touch sensor, or an ambient light sensor.

The hinge may be coupled to the base such that the bi-stable hinge part is located within a recess included in the base, and the barrel hinge part may be located outside of the base, and horizontally offset from the bi-stable hinge part.

The first position may be a position where the lid is in contact with the base, the second position may be a position where the lid is placed at an angle that is approximately 270 degrees with respect to the base, and the third position may be a position where the lid is placed at an angle that is approximately 360 degrees with respect to the base.

The barrel hinge part may enable the lid to rotate about the base with different amounts of resistance at different angular ranges from the first position, being in contact with the base, to the second position, being at an angle that is approximately 270 degrees with respect to the base. The bi-stable hinge part may include a torsion spring, a first arm of the torsion spring being connected to the first mounting tab and a second arm of the torsion spring being connected to the toggle pivot. The bi-stable hinge part may enable the lid to rotate from the second position to the third position when a torque applied to the lid when at the second position is greater than a resistance of the torsion spring. The torsion spring may enable the lid to rotate from the second position directly to the third position when the resistance of the torsion spring is overcome, the third position having the lid being at an angle that is approximately 360 degrees with respect to the base.

The toggle pivot may be surrounded by at least one friction element, the at least one friction element being connected to the first mounting tab. The bi-stable hinge part may enable the lid to rotate from the second position to the third position when a torque applied to the lid when at the second position is greater than a resistance of the at least one friction element surrounding the toggle pivot. The toggle pivot may enable an applied torque needed to overcome the at least one friction element surrounding the toggle pivot to be less than an applied torque needed to overcome the at least one friction element surrounding the hollow shaft. The third position places the lid at an angle that is approximately 360 degrees with respect to the base.

The at least one friction element surrounding a first portion of the hollow shaft may include a detent, and where rotating the at least one friction element of the barrel hinge to the detent causes the lid to rotate to the first position. A first applied torque may be needed to cause the lid to rotate to the first position, and a second applied torque may be needed to cause the lid to rotate to the second position and to the third position, the second applied torque being greater than the first applied torque.

In yet another general aspect, a method of coupling a base to a lid of a computing device using a hinge can include coupling a first mounting tab to the base, the first mounting tab being connected to a bi-stable hinge part that includes a toggle pivot and a toggle link bar, and coupling a second mounting tab to the lid, the second mounting tab being connected to a barrel hinge part that includes a hollow shaft, at least one friction element surrounding a first portion of the hollow shaft, and a casing surrounding a second portion of the hollow shaft, the casing being connected to the toggle link bar. The barrel hinge part can enable the at least one friction element to rotate about the hollow shaft causing the lid to rotate relative to the base, the rotation being from a first position to a second position, the bi-stable hinge part can have two stable rotational positions and unstable rotational positions between the two stable rotational positions, the bi-stable hinge part can enable the toggle pivot to rotate causing the lid to rotate relative to the base, the rotation being from the second position to a third position, and a diameter of the bi-stable hinge part can be less than a diameter of the barrel hinge part.

Example implementations may include one or more of the following features. For instance, the method may further include connecting a first electrical component in the base of the computing device to a second electrical component in the lid of the computing device using a plurality of wires that pass through the hollow shaft.

The method may further include placing the toggle pivot within a recess included in the base so that the barrel hinge part is located outside of the base, and horizontally offset from the bi-stable hinge part.

The details of one or more implementations are set forth in the accompanying drawings and the description below. Other features will be apparent from the description and drawings, and from the claims.

BRIEF DESCRIPTION OF THE DRAWINGS

FIGS. 2A-D are diagrams that illustrate example positions of a lid of a computing device with respect to a base of the computing device.

Like reference symbols in the various drawings indicate like elements.

DETAILED DESCRIPTION

In general, reducing the size and weight of a computing device can allow for the design of smaller, thinner, slimmer and more elegant enclosures. In addition, a user may utilize the computing device in different modes of operation. For example, a laptop or notebook computer that includes a touchscreen may be used in a "standard" mode. In the standard mode, a lid of the computing device can include a touchscreen and a user of the computing device can rotate the lid with respect to a base of the computing device. The user can rotate the lid to place the lid in a stationary position that is at a specific angle with respect to the base of the computing device. The user can place the base on a relatively flat stationary surface (e.g., a desktop, a lap of a user). An example of a standard mode is shown with respect to FIG. 2A, described in more detail below. In the standard mode, the user can interact with various inputs included in the base of the computing device while viewing the touchscreen. In addition, the touchscreen can receive input from the user.

The lid of the computing device may be rotated so that the back of the lid contacts the bottom of the base. This allows the computing device to be used, for example, in a tablet mode. An example of a tablet mode is shown with respect to FIG. 2D, described in more detail below.

Figure 1A:
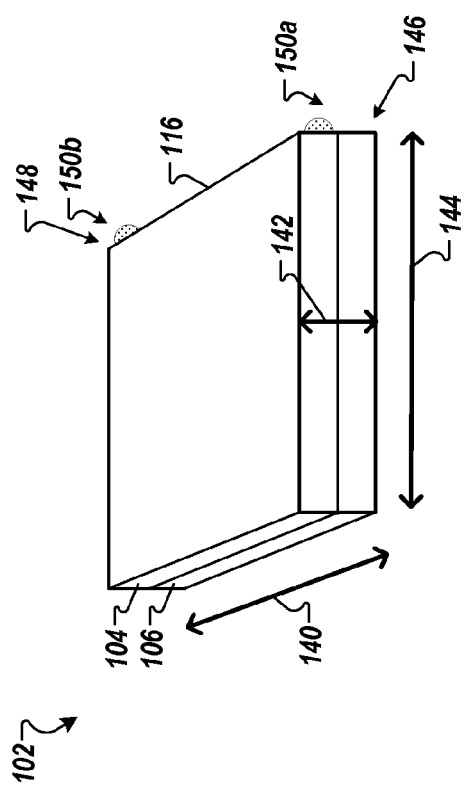
FIGS. 1A-B are diagrams that illustrate an example computing device that includes bi-stable dual pivot hinges.

In order for the computing device to be used in these multiple modes, the lid of the computing device can rotate/pivot approximately 360 degrees with respect to the base of the computing device. For example, the lid can be rotated from a closed position of the computing device, where the lid contacts an upper surface of the base to a fully opened position (tablet mode), where the lid contacts a lower surface of the base. FIG. 1A and FIG. 2D, respectively, illustrate examples of these positions.

In order to rotate the lid approximately 360 degrees with respect to the base, the computing device includes at least two pivot points. The two pivot points are spaced a distance from one another so that the lid can clear the base when rotated. In addition, or in the alternative, the two pivot points can prevent the lid and the base from skewing as the lid is being rotated.

In some implementations, a standard dual pivot hinge can connect a lid to a base of a computing device. The use of a dual pivot hinge allows for 180 degrees of rotation about pivot points. The diameter of each pivot point can be the same, and a first pivot point can be placed vertically above the second pivot point. The first pivot point can be coupled to the lid of the computing device and the second pivot point can be coupled to the base of the computing device. Each pivot point can utilize the same type of friction elements. In addition, when connecting the lid to the base of the computing device, wires can be run from electronics included in the base of the computing device to components included in the lid of the computing device (e.g., a touchscreen display) and vice versa. The wires can be threaded or placed along a pivot axis and may twist as the lid is rotated. As such, a pivot may include a hollow shaft for inclusion of the wires, and a diameter of the shaft is determined based on being large enough to accommodate the wires. In addition, the diameter of the pivot can be based on the inclusion of one or more friction elements, a mounting tab, and a cosmetic cover. For example, this can result in a pivot point that is approximately eight millimeters in diameter. To rotate the lid approximately 360 degrees with respect to the base, two such pivot points are needed, resulting in a computing device that is approximately 18 millimeters thick.

To reduce the thickness of the computing device while allowing the lid to be rotated approximately 360 degrees with respect to the base, a bi-stable dual pivot hinge can include two different diameter pivot structures horizontally offset from one another (i.e., not vertically stacked). A first pivot structure may utilize one type of friction element and may include a hollow shaft to incorporate wires running from the base of the computing device to the lid. The second pivot structure may pivot freely and may be held in position by some force (e.g., a spring) and through which no wires are run. This design allows the second pivot structure to be of a smaller diameter than the first pivot structure. This can allow for a computing device that can be thinner than a computing device that incorporates a standard dual pivot hinge. The second pivot structure can be of a diameter less than the first pivot structure and since the first pivot structure and the second pivot structure are not vertically stacked, the overall thickness of the computing device can be further reduced.

Figure 1B:
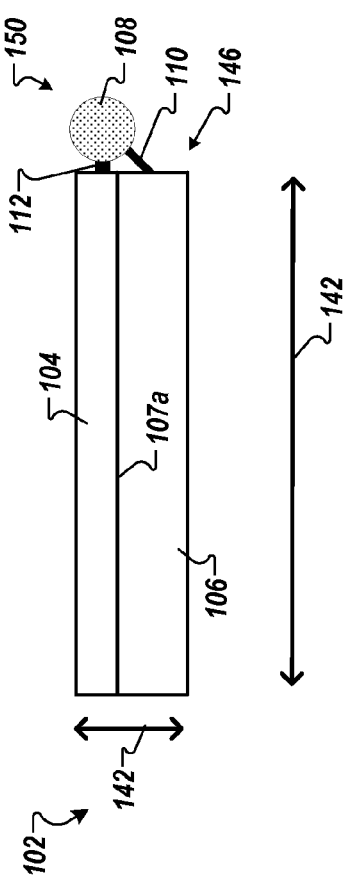
Figure 1C:
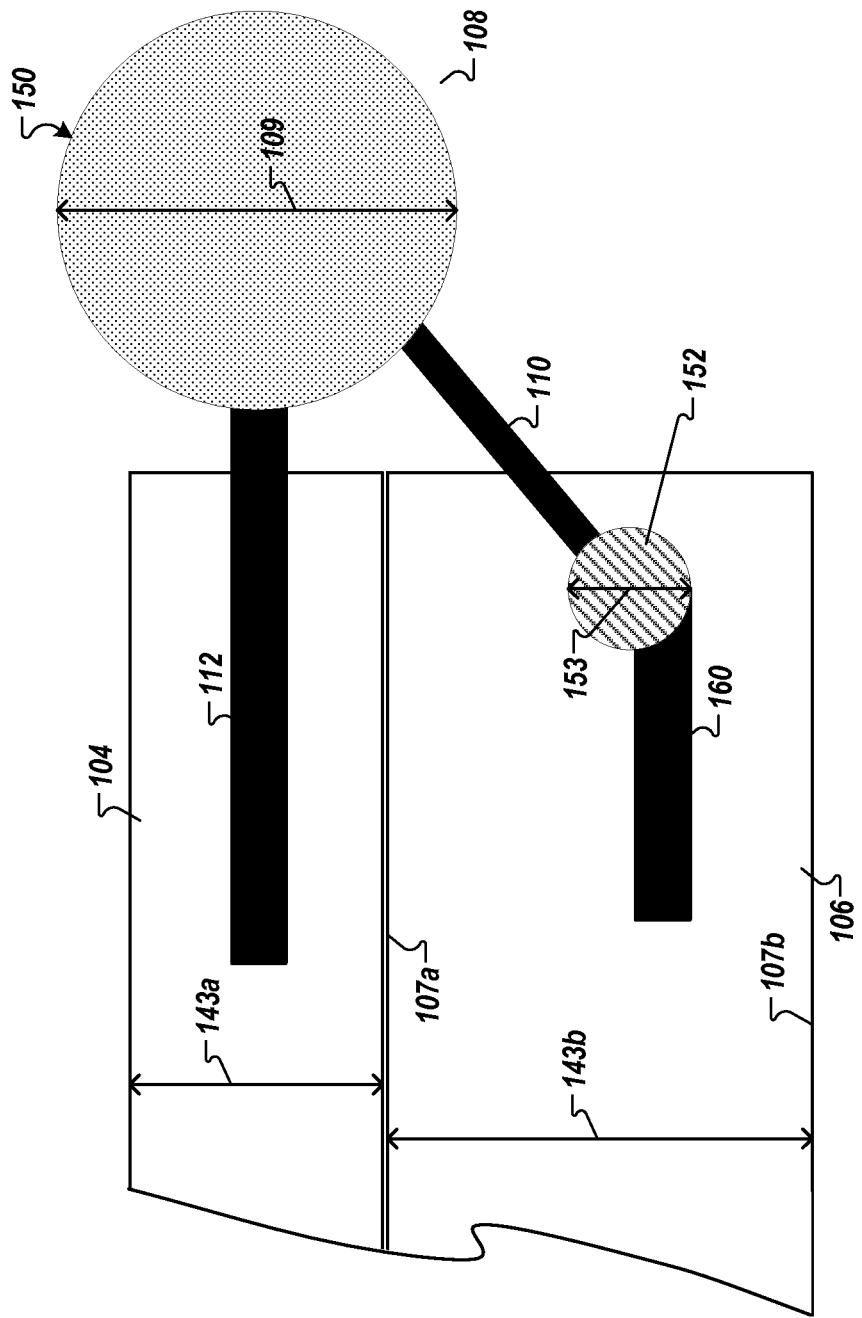
FIG. 1C is a diagram that illustrates a bi-stable dual pivot hinge showing parts that are located outside of, and inside of, a lid and a base of a computing device.

FIGS. 1A-C are diagrams that illustrate an example computing device 102 that includes bi-stable dual pivot hinges 150 (where reference to bi-stable dual pivot hinges 150 (without an alphabetical suffix) refers to the pair or bi-stable dual pivot hinges 150a and 150b).

FIG. 1A is a diagram that illustrates the example computing device 102 in a closed position where a lid 104 is substantially in contact with a base 106. The base 106 and the lid 104 can be attached to each other using a first bi-stable dual pivot hinge 150a that is located at first end of a back 116 of the computing device 102 and a second bi-stable dual pivot hinge 150b that is located at a second end of the back 116 of the computing device 102, opposite to the first end. In the example computing device 102 shown in FIG. 1A, the first end is proximate to a right side 146 of the computing device 102 and the second end is proximate to a left side 148 of the computing device 102.

Though the example computing device 102 includes two bi-stable dual pivot hinges 150 located at opposite ends of the back 116 of the computing device 102, other implementations are possible. For example, the computing device 102 may be a laptop or notebook computer, or a portable phone such as a flip phone. In some implementations, a computing device may include a single bi-stable dual pivot hinge, for example, when the computing device is a flip phone. In these implementations, based on the size of the computing device, a single bi-stable dual pivot hinge can be used to effectively rotate a lid approximately 360 degrees from a base of the computing device.

In another example, the computing device 102 may be a laptop computer with a large, high-resolution touchscreen incorporated into the lid 104 of the computing device. The use of a high-resolution screen can make the width 140 and the length 144 of the computing device 102 (and the lid 104) large enough so that a third bi-stable dual pivot hinge (e.g., located in the center of the back 116 of the computing device 102) along with the bi-stable dual pivot hinges 150 may be needed to effectively rotate the lid 104 approximately 360 degrees with respect to the base 106 of the computing device 102.

The descriptions of a bi-stable dual pivot hinge included herein can be applied to each bi-stable pivot hinge included in a computing device. As such, descriptions of the form and functionality of a first bi-stable pivot hinge can be applied to a description of the form and functionality of a second bi-stable pivot hinge (and any additional bi-stable pivot hinges) and vice versa.

FIG. 1B is a diagram that illustrates the example computing device 102 in a closed position from a side-view (the right side 146) where the lid 104 is substantially in contact with an upper surface 107a of the base 106. The bi-stable dual pivot hinge 150 includes a barrel hinge 108, a toggle neck 110, and a lid mounting tab 112 that are completely or, at least partially visible outside of the lid 104 and the base 106 of the computing device 102.

FIG. 1C is a diagram that illustrates the bi-stable dual pivot hinge 150 showing parts that are located outside of, and inside of, the lid 104 and the base 106 of the computing device 102. As shown in FIG. 1C, part of the lid mounting tab 112 is located outside of the lid 104 and part of the lid mounting tab 112 is located inside of the lid 104. Similarly, part of the toggle neck 110 is located outside of the base 106 and part of the toggle neck 110 is located inside of the base 106. In addition, the toggle neck 110 is connected to a toggle pivot 152. The toggle pivot 152 is connected to a base mounting tab 160. In some implementations, the toggle pivot 152 is located within a well included in the base 106 allowing the toggle pivot 152 to rotate/turn within the well. The lid mounting tab 112 is coupled to the lid so that movement of the lid mounting tab 112 results in movement of the lid 104. The base mounting tab 160 is coupled to the base 106.

In the example bi-stable dual pivot hinge 150 shown in FIG. 1C, a diameter 153 (e.g., 0.4 millimeters (mm)) of the toggle pivot 152 is less than a diameter 109 (e.g., 0.8 mm) of the barrel hinge 108. In some cases, a diameter 153 of the toggle pivot 152 may be less than 0.4 mm (e.g., 0.3 mm). In some cases, a diameter 153 of the toggle pivot 152 may be greater than 0.4 mm (e.g., 0.5 mm). In some cases, a diameter 109 of the barrel hinge 108 may be less than 0.8 mm (e.g., 0.7 mm). In some cases, a diameter 109 of the barrel hinge 108 may be greater than 0.8 mm (e.g., 0.9 mm).

A thickness (height) 142 of the computing device 102 may be determined based on the size (the diameter 153) of the toggle pivot 152 included in the base 106 of the computing device 102. For example, a base thickness (height) 143b can be determined such that the toggle pivot 152 fits within the base 106 and can be rotated within the base 106. A lid thickness (height) 143a may be determined, for example, based on a size (thickness) of a display device included in the lid 104. Since the barrel hinge 108 is placed outside of the computing device 102, its size (i.e., the diameter 109) does not contribute to determining the thickness of the lid 104 or the base 106. As will be described with reference to FIGS. 4-6, rotational criteria for the bi-stable dual pivot hinges 150 can determine a value for the diameter 109 and for the diameter 153. Keeping the diameter 153 of the toggle pivot 152 small can keep the thickness 143b of the base 106 small. This can result in a thin computing device 102 whose lid 104 can be rotated 360 degrees relative to the base 106.

In some implementations, the base thickness 143b is greater than the lid thickness 143a. In some implementations, the base thickness 143b is less than the lid thickness 143a. In some implementations, the base thickness 143b can be similar to (identical to) the lid thickness 143a.

The base 106 can be made of a rigid material, such as plastic or metal. The base 106 can include components of the computing device 102. The components can include, but are not limited to, a main logic board (MLB), a central processing unit (CPU), memory, a battery, and one or more input devices, such as a keyboard, a pointing stick, mouse buttons, a touchpad, and/or a trackpad. The base 106 can include an upper surface 107a and a lower surface 107b. The components of the computing device 102 can be positioned in an area between the upper surface 107a and the lower surface 107b.

FIGS. 2A-D are diagrams that illustrate example positions of a lid 204 of a computing device 202 with respect to a base 206 of the computing device 202. The computing device 202 may be the computing device 102 as shown in FIGS. 1A-C. FIGS. 2A-D refer to a bi-stable dual pivot hinge 250 and many of its parts that can be located outside of, and inside of, the lid 204 and the base 206 of the computing device 202. Though not shown, the computing device 202 can include a second bi-stable dual pivot hinge that includes similar parts. Reference to the bi-stable pivot hinge 250 can also refer to the pair of bi-stable pivot hinges.

Referring to FIGS. 1A-C, the use of the bi-stable dual pivot hinges 150 enable the lid 104 to rotate about the hinges 150 and relative to the base 106. The bi-stable dual pivot hinges 150 allow the lid 104 to rotate about the base 106, while constraining the rotational motion to prevent the lid 104 from slipping away from the base 106. In addition, the barrel hinge 108 allows the lid 104 to remain in a static position once the rotational motion is stopped.

The rotational motion allows a user of the computing device 102 to move the lid 104 to multiple positions, as shown in FIG. 1B and FIGS. 2A-D. For example, the lid 204 can include a display area that can provide visual output to the user. For example, the display area, can include a liquid crystal display (LCD), a plasma display, or a light-emitting diode (LED) display. The display area can also receive input from a user, for example as in a case where the display area includes a touchscreen device. The lid may also include a camera sensor, a touch sensor, or an ambient light sensor.

The base 206 can include one or more input devices such as a keyboard, a pointing stick, mouse buttons, a touchpad, and/or a trackpad. The multiple positions allow a user to change the viewing angle of the display area relative to the base 206 while the base 206 remains stationary. The user can place the computing device 202 into a configuration that allows the user to interact in a preferred way with the computing device 202.

FIG. 2A illustrates an example configuration of the computing device 202 where the lid 204 is rotated about bi-stable dual pivot hinges (e.g., bi-stable dual pivot hinge 250) and placed in a 135-degree position, where the lid 204 is at approximately a 135 degree angle (i.e., 135 degrees±35 degrees) with respect to the base 206, which remains stationary. In the 135-degree position, for example, the user can interact with the one or more input devices included in the base 206 while viewing a display included in the lid 204. In the 135-degree position, a lid mounting tab 212 is in-line with a toggle neck 210. In some cases, the placement of the lid 204 in this position can be a factor of the type of computing device. For example, a user using a laptop computer may place the lid 204 at greater than the 135 degree angle with respect to the base 206, while a user of a notebook or other computing device that is smaller than the laptop computer may place the lid 204 at an angle less than the 135 degree angle with respect to the base 206.

In some implementations, when the lid 204 is rotated to a position where the lid mounting tab 212 is in-line with the toggle neck 210, the lid portion 204 may be at an angle that is greater than 135 degrees with respect to the base 206. In some implementations, when the lid 204 is rotated to a position where the lid mounting tab 112 is in-line with the toggle neck 210, the lid portion 204 may be at an angle that is less than 135 degrees with respect to the base 206. On average, when the lid 204 is rotated to a position where the lid mounting tab 212 is in-line with the toggle neck 210, the lid portion 204 is at a 135 degree angle with respect to the base 206. In some implementations, one or more bi-stable dual pivot hinges about which the lid 204 is rotated (e.g., bi-stable dual pivot hinges 150) may include a detent or stop position. When the lid 204 is rotated to a position where the mounting tab 212 is in-line with the toggle neck 210, the rotational motion may be constrained requiring a user to apply additional torque if continuing to rotate the lid 204 in order to overcome the detent or stop.

FIG. 2B illustrates an example configuration of the computing device 202 where the lid 204 is rotated about bi-stable dual pivot hinges (e.g., bi-stable dual pivot hinge 250) and placed in a 180-degree position, where the lid 204 is placed at approximately a 180 degree angle (i.e, 180 degrees±20 degrees) with respect to the base 206, which remains stationary.

FIG. 2C illustrates an example configuration of the computing device 202 where the lid 204 is rotated about bi-stable dual pivot hinges (e.g., bi-stable dual pivot hinge 250) and placed in a 270-degree position, where the lid 204 is at approximately a 270 degree angle (i.e., 270 degrees±45 degrees) with respect to the base 206, which remains stationary.

Rotation of the lid 204 about the base 206 from a closed position (e.g., as shown in FIG. 1B) to the positions shown in FIGS. 2A-C is accomplished by a barrel hinge (e.g., barrel hinge 208) included in the bi-stable dual pivot hinge (e.g., the bi-stable dual pivot hinge 250). The rotation of the lid 204 about the base 206 to positions in between a closed position and the 270-degree position can also be accomplished by the barrel hinge 208 included in the bi-stable dual pivot hinge 250. When rotated about the barrel hinge 208, the lid 204 can be placed in static positions that are between the closed position and the 270-degree position.

FIG. 2D illustrates an example configuration of the computing device 202 where the lid 204 is rotated about bi-stable dual pivot hinges (e.g., bi-stable dual pivot hinge 250) and placed in a 360-degree position that is at approximately a 360 degree angle (i.e., 360 degrees±10 degrees) with respect to the base 206, which remains stationary. In this 360-degree position, the lid 204 is in contact with a lower surface 207b of the base 206. When the lid 204 is in the 270-degree position, the barrel hinge 208 has been rotated to a maximum position. The rotation of a toggle pivot 252 included in the bi-stable dual pivot hinge 250 can accomplish the further rotation of the lid 204 about the base 206 from the 270-degree position to the 360-degree position.

In some implementations, a user may apply a first torque when rotating the lid 204 into positions between the closed position (shown in FIG. 1B) and the 270-degree position (shown in FIG. 2C) in order to overcome the friction (resistance) of the barrel hinge 208. The user may then continually apply a second torque in order to rotate the lid 204 about the base 206 from the 270-degree position (shown in FIG. 2C) to the 360-degree position (shown in FIG. 2D). The applied torque can overcome friction (resistance) provided by one or more friction elements that may be included with (that may surround) the toggle pivot 252a.

In some implementations, a user may apply a first torque when rotating the lid 204 into positions between the closed position (shown in FIG. 1B) and the 180-degree position (shown in FIG. 2B) in order to overcome the friction of the barrel hinge 208. The user may then continually apply a second torque in order to rotate the lid 204 about the base 206 from the 180-degree position (shown in FIG. 2B) to the 360-degree position (shown in FIG. 2D). In some implementations, a user may apply a first torque when rotating the lid 204 into positions between the closed position and a second position in order to overcome the friction of the barrel hinge 208. The second position can be a position between the 180-degree position and the 360-degree position. The user may then continually apply a second torque in order to rotate the lid 204 about the base 206 from the second position to the 360-degree position.

In addition, the lid 204 may be placed in static positions in between those shown in FIG. 2C and FIG. 2D (the lid 204 may be placed at angles between the 270-degree position and the 360-degree position with respect to the base 206). In some implementations, the second torque may be greater than the first torque. In some implementations, the second torque may be less than the first torque. In some implementations, the second torque may be the same as the first torque.

In some implementations, the friction elements included with (that surround) the toggle pivot 252 can provide sufficient friction so that the lid 204 may be placed in multiple static positions between the 270-degree position (shown in FIG. 2C) and the 360-degree position (shown in FIG. 2D). In some implementations, the friction elements included with (that surround) the toggle pivot 252 may provide sufficient friction to keep the lid 204 from moving freely when it is moved beyond a 270-degree position. The friction elements included with (that surround) the toggle pivot 252, however, may not provide sufficient friction to allow the lid 204 to be placed in static positions between the 270-degree position (shown in FIG. 2C) and the 360-degree position (shown in FIG. 2D). In these implementations, a stop or other type of mechanism can hold the lid 204 in a static position when the lid 204 is placed in the 360-degree position (the lid 204 contacts the lower surface 207b of the base 206).

In some implementations, the toggle pivot 252 may be connected to a type of assist (e.g., a spring) that can enable the rotation of the lid 204 about the base 206 from the 270-degree position (shown in FIG. 2C) directly to the 360-degree position (shown in FIG. 2D). For example, a user can apply sufficient torque when rotating the lid 204 about the base 206, moving the lid 204 up to and beyond the 270-degree position (shown in FIG. 2C) until the assist takes over and completes the movement of the lid 204 to the 360-degree position (shown in FIG. 2D).

Figure 3:
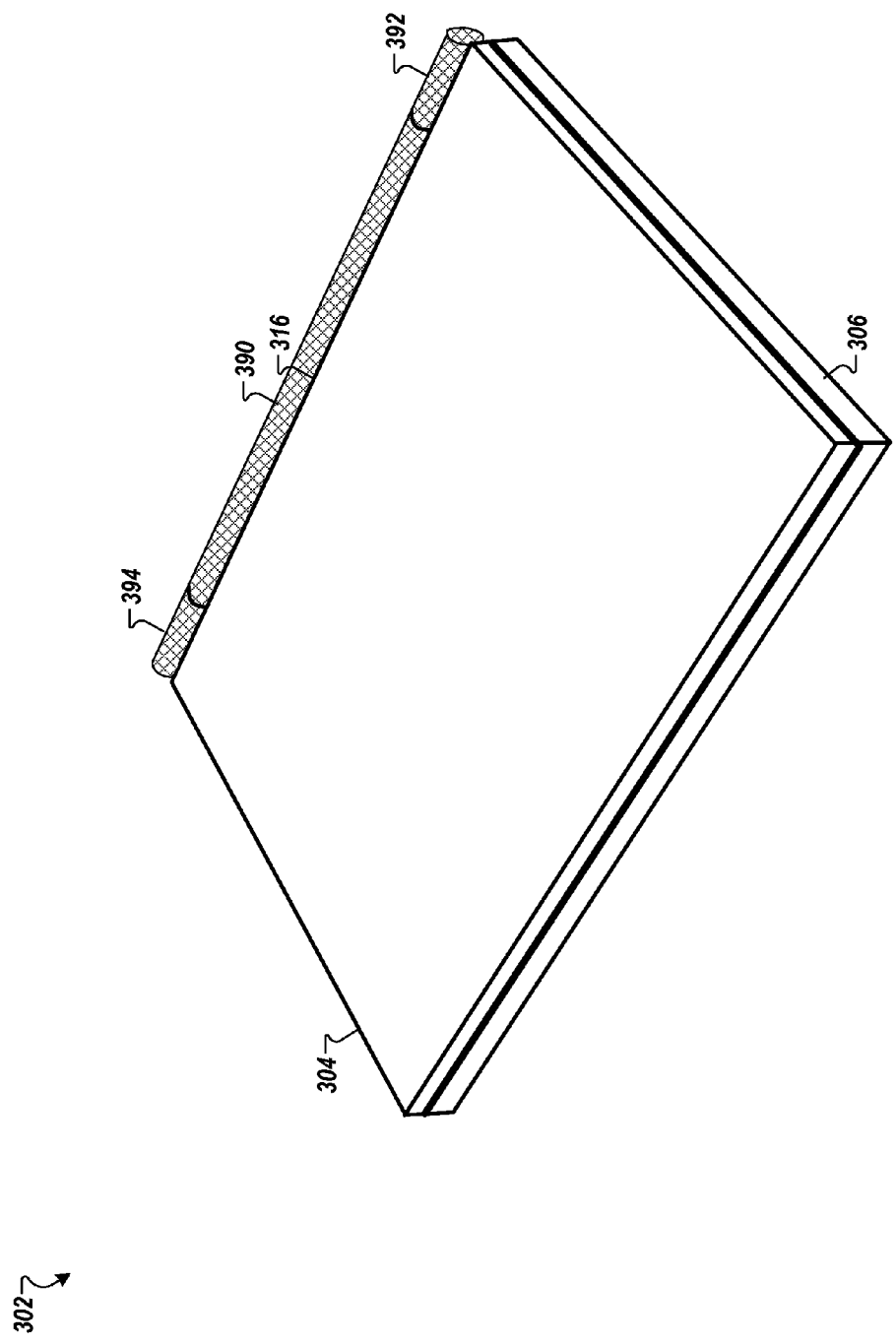
FIG. 3 is a diagram that illustrates a top view of an example computing device that includes a hinge assembly.

FIG. 3 is a diagram that illustrates a top view of an example computing device 302 that includes a hinge assembly (shown covered in FIG. 3). The computing device 302 can be any of the computing devices disclosed herein. The computing device 302 is shown in a closed position where a lid 304 is in contact with a top surface of a base 306. The hinge assembly will be shown and described with reference to FIG. 4A.

The hinge assembly is located at a back 316 of the computing device 302 and can include one or more (e.g., two) bi-stable dual pivot hinges (e.g., bi-stable dual pivot hinges 150 as shown in FIG. 1A) that can each be concealed/covered using a right end cover 392 and a left end cover 394, respectively. A center cover 390 can conceal/cover a hollow shaft and one or more cable passageways.

Figure 4A:
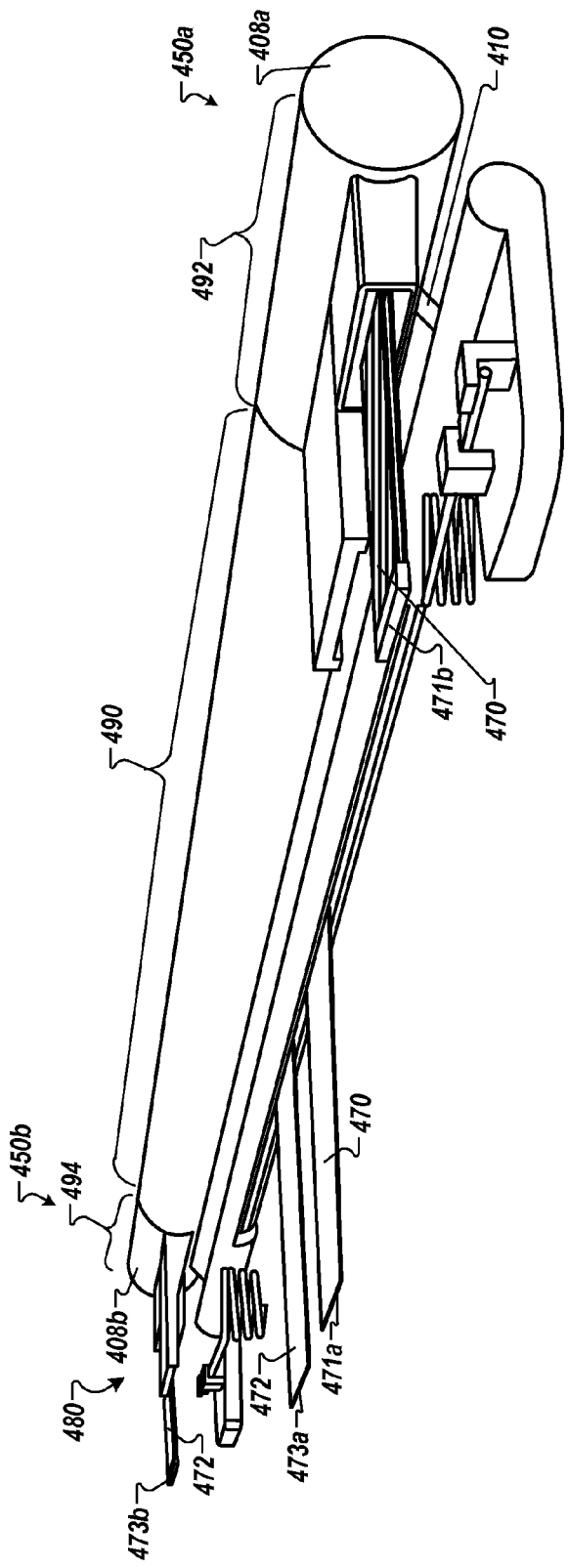
FIG. 4A is a diagram that illustrates a hinge assembly for a computing device.

FIG. 4A is a diagram that illustrates a hinge assembly 480 for a computing device (e.g., the computing devices disclosed herein). The hinge assembly 480 includes a right bi-stable dual pivot hinge 450a and a left bi-stable dual pivot hinge 450b, located at each end of the hinge assembly 480. The two bi-stable dual pivot hinges 450a, 450b will be described in more detail in FIG. 4B and FIG. 5, respectively.

A center cover 490 conceals/covers a hollow shaft and one or more cable passageways. A right end cover 492 conceals/covers a right barrel hinge 408a. A left end cover 494 conceals/covers a left barrel hinge 408b. The one or more cable passageways allow a first cable 470 and a second cable 472 to pass through the cable passageways from a base of a computing device (e.g., the base 306 of the computing device 302) to a lid of a computing device (e.g., the lid 304 of the computing device 302). The first cable 470 can pass into and through the right end cover 492. Similarly, the second cable 472 can pass into and through the left end cover 494. Though FIG. 4A shows two cables 470, 472, in some implementations, a single cable can be run through the cable passageways.

The cables 470, 472 can be made of electrical connection materials (wires). The cables 470, 472 can serve as electronic communication mediums for different electrical components included in a computing device. The cables 470, 472 can connect, at one end (cable ends 471a, 473a, respectively), to electrical components included in the base of the computing device. The cables 470, 472 can also connect to electrical components included in the lid of the computing device at cable ends 471b, 473b, respectively.

In some implementations, the cables 470, 472 can be ribbon cables that include a plurality of separate wires. In some implementations, individual wires may be bundled or otherwise tied together to form a cable.

Figure 4B:
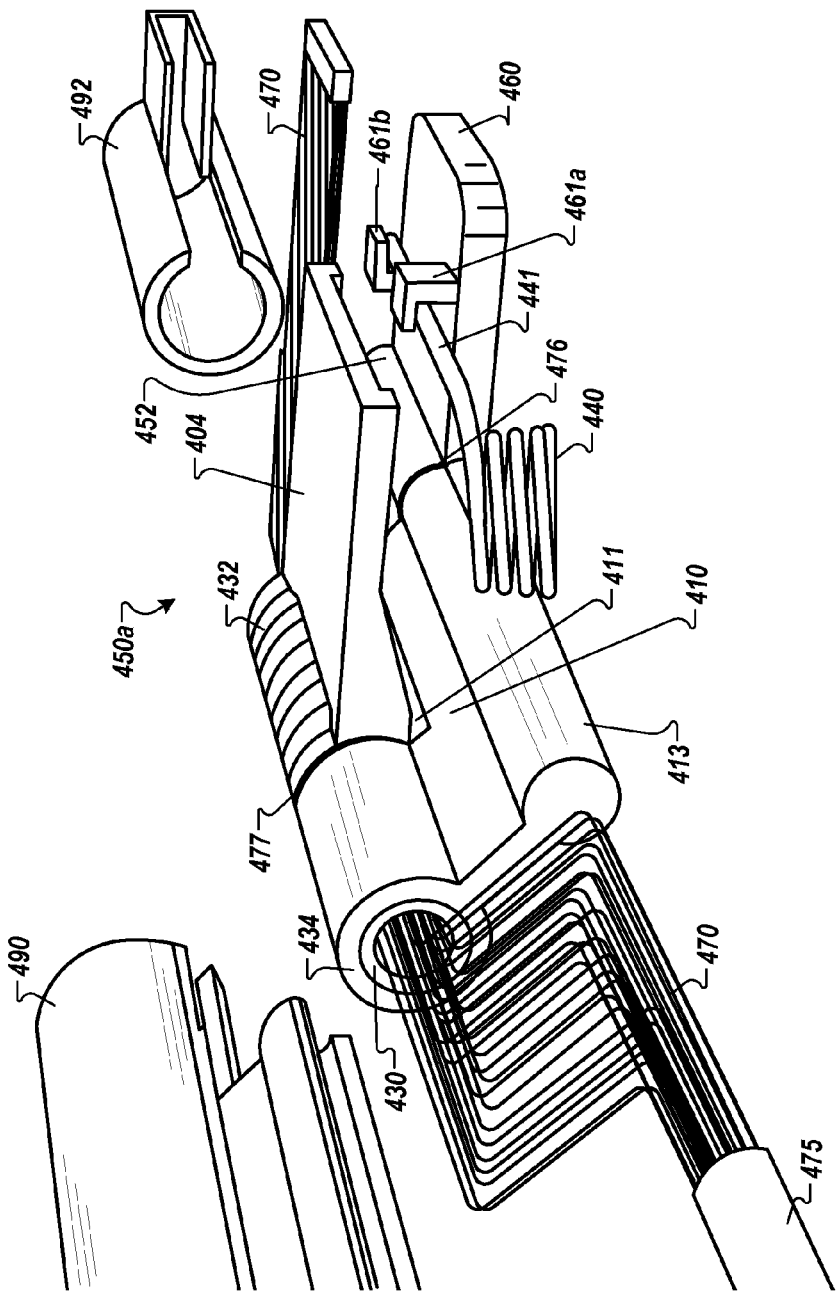
FIG. 4B is a diagram that illustrates an example perspective view of the right bi-stable dual pivot hinge.

FIG. 4B is a diagram that illustrates an example perspective view of the right bi-stable dual pivot hinge 450a. Referring to FIG. 4A, the first cable 470 passes from cable passageways (e.g., cable passageway 475) from a base of a computing device (e.g., the base 306 of the computing device 302) through a hollow shaft 430. The first cable 470 exits the hollow shaft 430 and is then parallel to a lid mounting tab 404. The right end cover 492 conceals/covers a right barrel hinge 408a and partially conceals/covers the first cable 470.

A toggle neck 410 is connected to a toggle pivot 413 and a casing 434 that surrounds a first end of the hollow shaft 430. One or more friction elements 432 surround a second end of the hollow shaft 430. An upper split line 477 shows a boundary between the two ends of the hollow shaft 430. The friction elements 432 are connected to a lid mounting tab 404. The friction elements 432 can move/rotate about the second end of the hollow shaft 430.

A toggle link bar 452 is connected to a base mounting tab 460. A lower split line 476 shows a boundary between the toggle link bar 452 and the toggle pivot 413. A first arm 441 of a torsion spring 440 is connected to the base mounting tab 460 using brackets 461a-b. A second arm (not shown) of the torsion spring 440 is connected to the toggle pivot 413. The friction elements 432, the second end of the hollow shaft 430 and the lid mounting tab 404 can be the parts for the right barrel hinge 408a. The toggle link bar 452 and the toggle pivot 413 can be considered the parts for a right bi-stable hinge.

Figure 5:
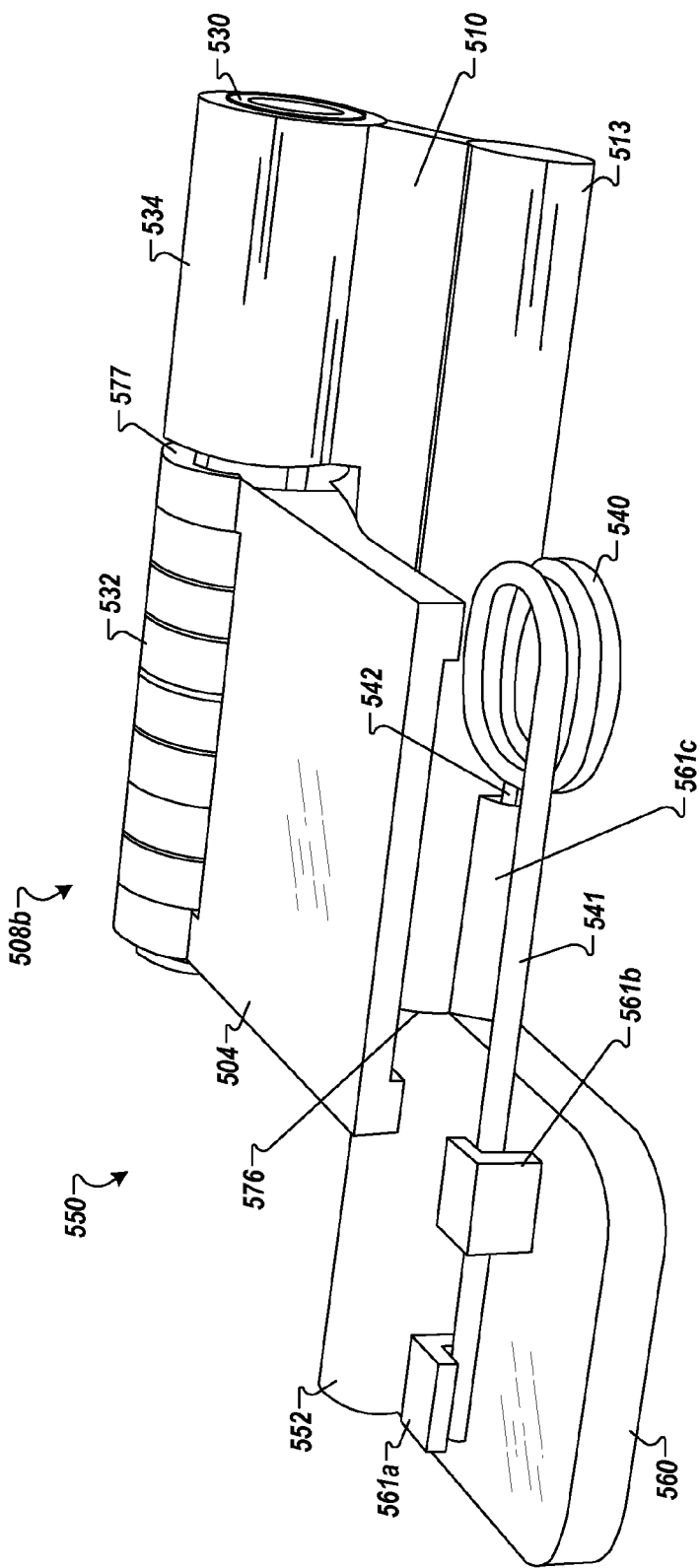
FIG. 5 is a diagram that illustrates an example close-up perspective view of parts of a left bi-stable dual pivot hinge.

The friction elements 432, the second end of the hollow shaft 430, the lid mounting tab 404, the toggle link bar 452, the toggle neck 410, the base mounting tab 460, the right end cover 492, and the torsion spring 440 can be the parts for the right bi-stable dual pivot hinge 450a. FIG. 5 shows an example of a left bi-stable dual pivot hinge (e.g., the left bi-stable dual pivot hinge 450b).

Referring to FIGS. 1A-C and 2A-D, the lid mounting tab 404 is coupled to/connected to a lid (e.g., the lid 104, the lid 204) of a computing device (e.g., the computing device 102, the computing device 202). The base mounting tab 460 is coupled to/connected to a base (e.g., the base 106, the base 206) of a computing device (e.g., the computing device 102, the computing device 202). The friction elements 432 rotate about the second end of the hollow shaft 430 in order to rotate the lid about the base. The rotation can move the lid (e.g., the lid 104) from a position where the lid covers/contacts an upper surface (e.g., the upper surface 107a) of the base (e.g., the base 106). The example shown in FIG. 4B shows the right bi-stable dual pivot hinge 450a in a position where the computing device is in a closed position.

As shown in FIGS. 2A-D, the lid 204 can rotate about the base 206 from a closed position (the position shown in FIG. 1B) to a 270-degree position (the position shown in FIG. 2C). Referring to FIG. 4B, the friction elements 432 can rotate about the hollow shaft 430 rotating the lid mounting tab 404 (and subsequently the lid) from the position shown (the closed position) to a position where further rotation of the lid mounting tab 404 is no longer possible (the 270-degree position). In some implementations, when the lid mounting tab 404 contacts/meets an edge 411 of the toggle neck 410, further rotation of the lid mounting tab is not possible. In some implementations, the rotation of the lid mounting tab 404 can be limited dependent on other structures/parts of the barrel hinge 408a. In the 270-degree position, the rotation of the friction elements 432 about the hollow shaft 430 stops (bottoms out) and rotation of the lid in this manner is complete.

The friction elements 432 can be made such that the applied friction to the lid 204 can hold the lid 204 in a fixed position. In addition, the friction elements 432 can be made such that the torque applied to the lid 204 by the user to rotate/move the lid 204 to the desired fixed position can be easily applied by the user.

The right end cover 492 ties/links the first cable 470 with the lid mounting tab 404. Therefore, as the friction elements 432 rotate about the second end of the hollow shaft 430, the first cable 470, which is passed through the hollow shaft 430, will twist based on the rotation.

The continued rotation of the lid with respect to the base in order to rotate the lid from the 270-degree position (as shown in FIG. 2C) to a 360-degree position (as shown in FIG. 2D) is accomplished by the toggle pivot 413 and the torsion spring 440. This continued rotation will be described with respect to FIG. 5.

FIG. 5 is a diagram that illustrates an example close-up perspective view of parts of a left bi-stable dual pivot hinge 550 (e.g., the left bi-stable dual pivot hinge 450b). Similar to the right bi-stable dual pivot hinge 450a, shown in FIG. 4B, a toggle neck 510 is connected to a casing 534 that surrounds a first end of the hollow shaft 530. One or more friction elements 532 surround a second end of the hollow shaft 530. An upper split line 577 shows a boundary between the first end of the hollow shaft 530 and the second end of the hollow shaft 530. The friction elements 532 are connected to a lid mounting tab 504. The friction elements 532 can move/rotate about the hollow shaft 530.

A toggle pivot 513 is connected to a base mounting tab 560. A lower split line 576 shows a boundary between a toggle link bar 552 and the toggle pivot 513. A first arm 541 of a torsion spring 540 is connected to the base mounting tab 560 using brackets 561a-b. A second arm 542 of the torsion spring 540 is connected to the toggle pivot 513 using a bracket 561c.

The friction elements 532, the second end of the hollow shaft 530 and the lid mounting tab 504 can be considered the parts for a left barrel hinge 508b (e.g., the left barrel hinge 408b as shown in FIG. 4A). The toggle link bar 552 and the toggle pivot 513 can be considered the parts for a left bi-stable hinge.

As described in FIGS. 2A-C, the lid 204 can rotate about the base 206 from a closed position (shown in FIG. 1B) to a 270-degree position (shown in FIG. 2C) where the lid 204 is at approximately a 270 degree angle with respect to the base 206. Similar to the right bi-stable dual pivot hinge 450a the friction elements 532 can rotate about the second end of the hollow shaft 530 rotating the lid mounting tab 504 (and subsequently the lid) from the position shown in FIG. 5 (the closed position) to the 270-degree position. In the 270-degree position, the rotation of the friction elements 532 about the second end of the hollow shaft 530 stops (bottoms out) and rotation of the lid by the left barrel hinge is complete.

Referring to FIG. 3, FIG. 4A-B, and FIG. 5, the right bi-stable dual pivot hinge 450a and the left bi-stable dual pivot hinge 450b rotate/move in unison with one another in order to rotate the lid 304 about the base 306 of the computing device 302 because the lid mounting tab 404 and the lid mounting tab 504 are coupled to the lid 304 of the computing device 302 and the base mounting tab 460 and the base mounting tab 560 are coupled to the base 306 of the computing device 302.

Movement of the lid from the 270-degree position to the 360-degree position is accomplished by the rotation of the toggle pivot 513 with assistance from the torsion spring 540. A user of the computing device can apply a torque to the lid in order to rotate the lid beyond the 270-degree position. The torque needed to rotate/move the lid beyond the 270-degree position has to overcome the resistance provided by the torsion spring 540. In some implementations, the torque can be greater than the torque applied to the lid when rotating/moving the lid from a closed position to a 270-degree position. In some implementations, the torque can be less than the torque applied to the lid when rotating/moving the lid from a closed position to a 270-degree position. In some implementations, the torque can be the same as the torque applied to the lid when rotating/moving the lid from a closed position to a 270-degree position.

The applied torque can rotate the toggle pivot 513. As the toggle pivot 513 rotates about its central axis, the second arm 542 of the torsion spring 540 housed within the bracket 561c on the perimeter of the toggle pivot 513 initially moves towards the first arm 541 of the torsion spring 540. This movement compresses the coils of the torsion spring 540, causing a torque to be applied to the toggle pivot 513 that resists the torque used to move the lid past the 270-degree position. As the toggle pivot 513 is further rotated, the coils of the torsion spring 540 continue to be compressed until the rotation reaches a point at which the arms 541, 542 of the torsion spring 540 are at a minimum distance from each other. Then, the toggle pivot 513 is rotated beyond this point, the distance between the arms 541, 542 of the spring will increase and the compression of the coils of the torsion spring 540 will then apply a torque to the toggle pivot 513 that increases the rotation of the toggle pivot 513. Thus, the energy stored in the compressed torsion spring 540 as it relaxes facilitates the movement of the lid to complete the movement of the lid to the 360-degree position, where the lid contacts a bottom surface of the base (as shown in FIG. 2D).

In some implementations, the relaxing of the torsion spring 540 to complete the movement of the lid to the 360-degree position can result in a "snapping" of the lid to the bottom surface of the base of the computing device. In these implementations, it may be desirable to dampen the "snapping". For example, one or more friction elements may be included that can surround the toggle pivot 513. The friction elements can provide an amount of friction to the rotation of the toggle pivot 513 that can dampen the "snapping" of the lid to the bottom surface of the base.

In some implementations, the friction elements 532 may include a detent when the lid of the computing device is in a 135-degree position (e.g., the position as shown in FIG. 2A). The detent can "lock" the left barrel hinge 508b to the toggle pivot 513. In order to smoothly rotate/move the lid beyond the 135-degree position and directly towards a 360-degree position (as shown in FIG. 2D), a user can apply a second torque to the lid that is greater than a first torque used to rotate/move the lid to the 135-degree position and greater than a torque needed to rotate the toggle pivot 513. Doing so, the user overcomes the detent and then can rotate/move the lid from the 135-degree position to the 360-degree position using a smooth, continuous motion. For example, the torque needed to overcome the detent and to further rotate/move the lid can be substantially the same as the torque needed to rotate the toggle pivot 513 in order to overcome the torque of the torsion spring 540.

Various types of springs may be used to implement the torsion spring 540. The types of springs can include, but are not limited to, helical springs, coiled springs, flat springs, "clothespin" springs and compression springs. The springs can be made from a type of spring steel.

The implementations described in FIGS. 4A-B and FIG. 5 show two, symmetrical bi-stable dual pivot hinges that each include a torsion spring. In some implementations, only one of the two bi-stable dual pivot hinges may include a torsion spring. The determination of the number of torsion springs needed to complete the rotation of a lid of a computing device from a 270-degree position to a 360-degree position can be based on the size, weight and overall structure of the computing device. For example, a smaller device with a light-weight lid may only require a single torsion spring. In addition or in the alternative, the type of spring may also determine the number of torsion springs needed in a computing device.

Figure 6B:
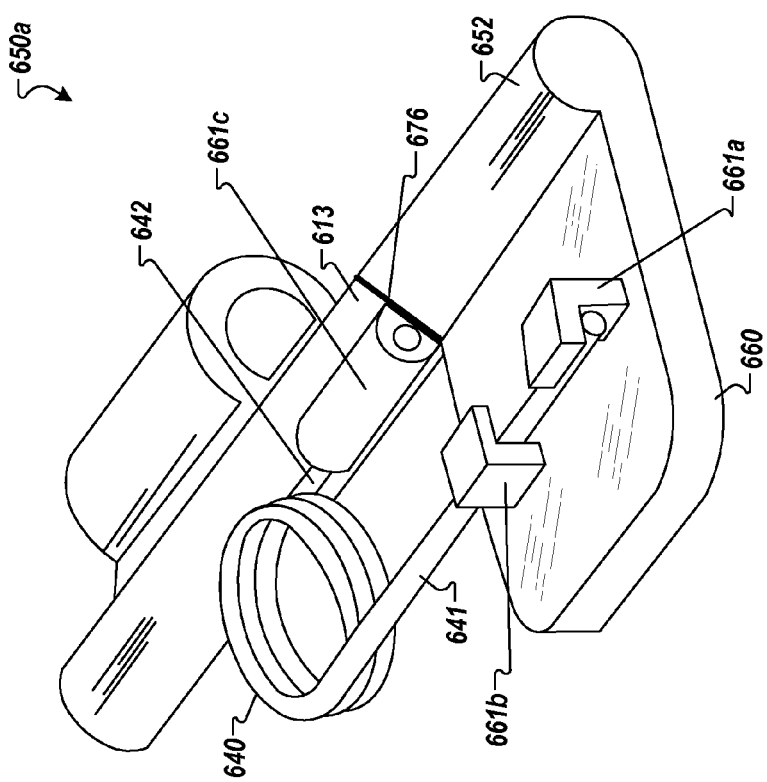
FIGS. 6A-B are diagrams that illustrate an example bi-stable dual pivot hinge in a first position and a second position, respectively.
Figure 6A:
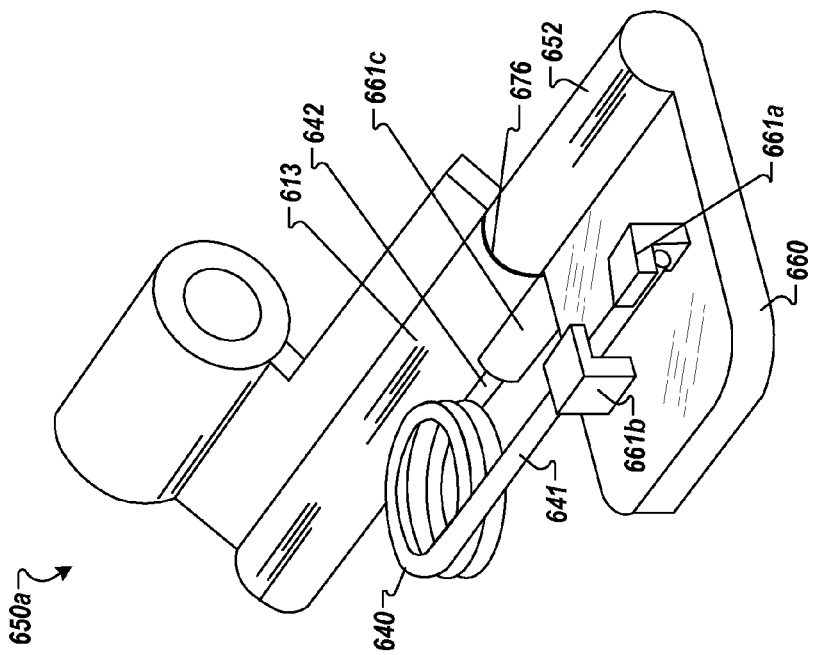

FIGS. 6A-B are diagrams that illustrate an example bi-stable dual pivot hinge 650a (e.g., the right bi-stable dual pivot hinge 450a as shown in FIG. 4B) in a first position and a second position, respectively. As shown in FIGS. 6A-B, a first arm 641 of a torsion spring 640 is connected to a base mounting tab 660 using brackets 661a-b. A second arm 642 of the torsion spring 640 is connected to a toggle pivot 613 using a bracket 661c. A lower split line 676 shows a boundary between a toggle link bar 652 and the toggle pivot 613.

In FIG. 6A, the bi-stable dual pivot hinge 650a is in a first position and the torsion spring 640 is in a first relaxed state. The first position can be a position where a lid of a computing device is placed at or between a closed position (as shown in FIG. 1B) and a 270-degree position (as shown in FIG. 2C). A barrel hinge (e.g., the barrel hinge 208) can rotate/move the lid of the computing device to these positions or any positions in between.

In FIG. 6B, the bi-stable dual pivot hinge 650a is in a second position and the torsion spring 640 is in a second relaxed state. The second position can be a position where a lid of a computing device is at a 360-degree position (as shown in FIG. 2D). As described with reference to FIG. 5, the toggle pivot 613 with the assistance of the torsion spring 640 can rotate/move the lid of the computing device from a 270-degree position (as shown in FIG. 2C) to the 360-degree position (as shown in FIG. 2D).

Figure 7:
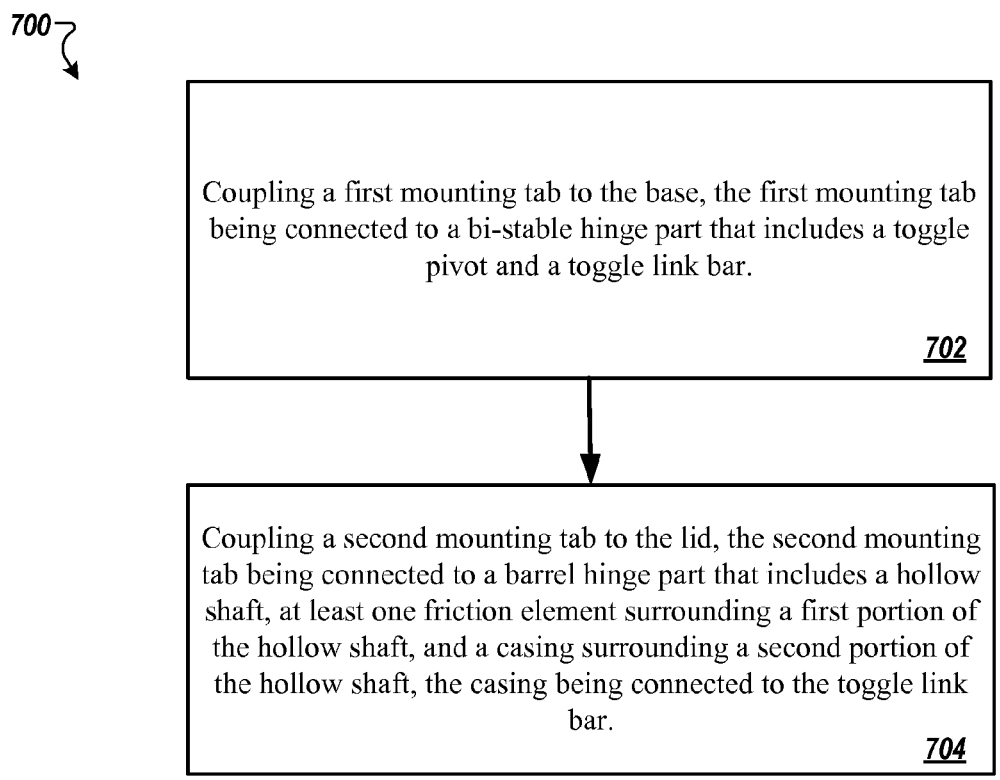
FIG. 7 is a flowchart that illustrates an example method for connecting a lid of a computing device to a base of a computing device using a bi-stable dual pivot hinge.

FIG. 7 is a flowchart that illustrates an example method 700 for connecting a lid of a computing device to a base of a computing device using a bi-stable dual pivot hinge. According to this example, the method 700 includes coupling a first mounting tab to the base, the first mounting tab being connected to a bi-stable hinge part that includes a toggle pivot and a toggle link bar (702). The method 700 also includes coupling a second mounting tab to the lid, the second mounting tab being connected to a barrel hinge part that includes a hollow shaft, at least one friction element surrounding a first portion of the hollow shaft, and a casing surrounding a second portion of the hollow shaft, the casing being connected to the toggle link bar (704).

Though the implementations herein are described with respect to a user rotating a lid of a computing device from a closed position (closed position) to a 360-degree position, they can also be applied to a user rotating a lid from the 360-degree position to the closed position.

A number of embodiments have been described. Nevertheless, it will be understood that various modifications may be made without departing from the spirit and scope of the disclosure.

In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other embodiments are within the scope of the following claims.

While certain features of the described implementations have been illustrated as described herein, many modifications, substitutions, changes and equivalents will now occur to those skilled in the art. It is, therefore, to be understood that the appended claims are intended to cover all such modifications and changes as fall within the scope of the implementations. It should be understood that they have been presented by way of example only, not limitation, and various changes in form and details may be made. Any portion of the apparatus and/or methods described herein may be combined in any combination, except mutually exclusive combinations. The implementations described herein can include various combinations and/or sub-combinations of the functions, components and/or features of the different implementations described.

What is claimed is:

1. A computing device comprising:
    a lid;
    a base coupled to the lid by a hinge, the hinge including:
        a bi-stable hinge part including a toggle pivot and a toggle link bar; and
        a barrel hinge part including a hollow shaft, at least one friction element surrounding a first portion of the hollow shaft, and a casing surrounding a second portion of the hollow shaft, the casing being connected to the toggle link bar;
a first mounting tab being connected to the toggle link bar and being connected to the base; and
a second mounting tab being connected to the at least one friction element and being connected to the lid,
wherein the barrel hinge part enables the at least one friction element to rotate about the hollow shaft causing the lid to rotate relative to the base, the rotation being from a first position to a second position,
wherein the bi-stable hinge part has two stable rotational positions and unstable rotational positions between the two stable rotational positions,
wherein the bi-stable hinge part enables the toggle pivot to rotate causing the lid to rotate relative to the base, the rotation being from the second position to a third position, and
wherein a diameter of the bi-stable hinge part is less than a diameter of the barrel hinge part.

2. The computing device of claim 1, further comprising a plurality of wires that pass through the hollow shaft.

3. The computing device of claim 2, wherein the plurality of wires connect a first electrical component in the base of the computing device to a second electrical component in the lid of the computing device.

4. The computing device of claim 3, wherein the first electrical component is a main logic board.

5. The computing device of claim 3, wherein the second electrical component is one of a display, a camera sensor, a touch sensor, or an ambient light sensor.

6. The computing device of claim 1, wherein the hinge is coupled to the base such that the bi-stable hinge part is located within a recess included in the base, and the barrel hinge part is located outside of the base, and horizontally offset from the bi-stable hinge part.

7. The computing device of claim 1, wherein the first position is a position where the lid is in contact with the base, wherein the second position is a position where the lid is placed at an angle that is approximately 270 degrees with respect to the base, and wherein the third position is a position where the lid is placed at an angle that is approximately 360 degrees with respect to the base.

8. The computing device of claim 1, wherein the barrel hinge part enables the lid to rotate about the base with different amounts of resistance at different angular ranges from the first position being in contact with the base to the second position being at an angle that is approximately 270 degrees with respect to the base.

9. The computing device of claim 8, wherein the bi-stable hinge part includes a torsion spring, a first arm of the torsion spring being connected to the first mounting tab and a second arm of the torsion spring being connected to the toggle pivot.

10. The computing device of claim 9, wherein the bi-stable hinge part enables the lid to rotate from the second position to the third position when a torque applied to the lid when at the second position is greater than a resistance of the torsion spring.

11. The computing device of claim 10, wherein the torsion spring enables the lid to rotate from the second position directly to the third position when the resistance of the torsion spring is overcome, the third position having the lid being at an angle that is approximately 360 degrees with respect to the base.

12. The computing device of claim 8, wherein the toggle pivot is surrounded by at least one friction element, the at least one friction element being connected to the first mounting tab.

13. The computing device of claim 12, wherein the bi-stable hinge part enables the lid to rotate from the second position to the third position when a torque applied to the lid when at the second position is greater than a resistance of the at least one friction element surrounding the toggle pivot.

14. The computing device of claim 13, wherein the toggle pivot enables an applied torque needed to overcome the at least one friction element surrounding the toggle pivot to be less than an applied torque needed to overcome the at least one friction element surrounding the hollow shaft.

15. The computing device of claim 13, wherein the third position places the lid at an angle that is approximately 360 degrees with respect to the base.

16. The computing device of claim 1, wherein the at least one friction element surrounding a first portion of the hollow shaft includes a detent, and wherein rotating the at least one friction element of the barrel hinge to the detent causes the lid to rotate to the first position.

17. The computing device of claim 16, wherein a first applied torque is needed to cause the lid to rotate to the first position, and a second applied torque is needed to cause the lid to rotate to the second position and to the third position, the second applied torque being greater than the first applied torque.

18. A method of coupling a base to a lid of a computing device using a hinge, the method comprising:
coupling a first mounting tab to the base, the first mounting tab being connected to a bi-stable hinge part that includes a toggle pivot and a toggle link bar; and
coupling a second mounting tab to the lid, the second mounting tab being connected to a barrel hinge part that includes a hollow shaft, at least one friction element surrounding a first portion of the hollow shaft, and a casing surrounding a second portion of the hollow shaft, the casing being connected to the toggle link bar,
wherein the barrel hinge part enables the at least one friction element to rotate about the hollow shaft causing the lid to rotate relative to the base, the rotation being from a first position to a second position,
wherein the bi-stable hinge part has two stable rotational positions and unstable rotational positions between the two stable rotational positions,
wherein the bi-stable hinge part enables the toggle pivot to rotate causing the lid to rotate relative to the base, the rotation being from the second position to a third position, and
wherein a diameter of the bi-stable hinge part is less than a diameter of the barrel hinge part.

19. The method of claim 18, further comprising:
connecting a first electrical component in the base of the computing device to a second electrical component in the lid of the computing device using a plurality of wires that pass through the hollow shaft.

20. The method of claim 18, further comprising:
placing the toggle pivot within a recess included in the base so that the barrel hinge part is located outside of the base, and horizontally offset from the bi-stable hinge part.

* * * * *